United States Patent
Bushey et al.

(10) Patent No.: US 7,245,404 B2
(45) Date of Patent: Jul. 17, 2007

(54) DYNAMICALLY PROGRAMMABLE IMAGE CAPTURE APPLIANCE AND SYSTEM

(75) Inventors: Robert D. Bushey, San Diego, CA (US); Michelle Lehmeier, Loveland, CO (US); Michelle A. Watson, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 875 days.

(21) Appl. No.: 10/321,887

(22) Filed: Dec. 17, 2002

(65) Prior Publication Data

US 2004/0117758 A1    Jun. 17, 2004

(51) Int. Cl.
*H04N 1/46* (2006.01)
*G06K 1/00* (2006.01)
*G06K 9/00* (2006.01)
*G06F 15/80* (2006.01)

(52) U.S. Cl. .................. 358/405; 358/1.1; 345/505; 382/162

(58) Field of Classification Search ............... 345/505; 358/405, 1.1; 382/162, 254; 395/704
See application file for complete search history.

(56) References Cited

U.S. PATENT DOCUMENTS 5,986,703 A * 11/1999 O'Mahony ............. 348/333.12
6,126,328 A * 10/2000 Mallory et al. ............. 717/114
6,269,180 B1 * 7/2001 Sevigny ...................... 382/162
6,272,593 B1 * 8/2001 Dujari ......................... 711/118
6,384,832 B1 * 5/2002 Muramatsu et al. ........ 345/505
2002/0169849 A1   11/2002 Schroath

FOREIGN PATENT DOCUMENTS

| FR | 2832888 | 5/2003 |
|---|---|---|
| GB | 2 379 761 | 3/2003 |
| JP | 2002044502 | 8/2002 |
| WO | WO 02/41239 | 5/2002 |

* cited by examiner

*Primary Examiner*—Twyler Lamb
*Assistant Examiner*—Houshang Safaipour

(57) ABSTRACT

A multiple function image capture and serving apparatus that comprises a processor unit having firmware memory with instructions for implementing an operating system and random access memory for receiving at least one executable code sections for performing a selected one of a plurality of image capture tasks; a network access module for communicatively connecting the processor unit to an ICA code server, wherein the processor unit in response to executing the operating system and selection of the task by a user is adapted to request and receive from the server at least one executable code sections for performing the selected task; and an image capture module for receiving and converting a visual image into a digital image signal and making said signal available to the processor unit for performing upon it the selected task pursuant to execution of the at least one received executable code sections.

21 Claims, 3 Drawing Sheets

DYNAMICALLY PROGRAMMABLE IMAGE CAPTURE APPLIANCE AND SYSTEM

FIELD OF THE INVENTION

The present invention relates generally to image capture devices and in particular to a dynamically programmable image capture appliance.

DESCRIPTION OF THE RELATED ART

There exists a variety of image capture devices such as digital cameras (video and still), scanners, copy machines, printers, and photo-processing machines. These devices can be relatively simple, or they can be highly sophisticated with the capability to perform a variety of image and photo processing tasks such as raster-to-vector conversion, demosaicing, and optical character recognition (OCR). These devices and/or functions have typically been provided in task-specific device form. However recently, a market has grown for a single device that consolidates many or all of these image capture functions. Unfortunately, there are several problems with integrating multiple image capture functions into a single device.

To begin with, individual devices are typically programmed with a device-specific language. For example, printers are commonly programmed with a printer control language (PCL). These different programming schemes are not a problem because most of these devices have been designed to work as peripheral in cooperation with a computer. In such cases, device drivers run on the computer and interface between the computer and the peripheral device. Unfortunately, however, it has not been practical to incorporate each separate programming scheme in a single device for performing the various image capture functions. That is, it is inefficient to use a device that is capable of separately executing the various different programs written in the different machine languages.

A separate but related problem is that even if a common machine programming language is used in a multi-function device with all of the various functions, an exorbitant amount of memory (i.e., ROM firmware) is required for storing the code needed to perform the many different tasks that would ideally be available on such a device.

One attempted solution is to use a general-purpose image capture appliance (ICA) that only permanently stores system and utility software and downloads task-specific programs on an as needed basis. An example of such a solution implements a Java Virtual Machine (JVM). Unfortunately, the JVM solution, as well as other similar solutions, are interpretive, which means they are inefficient and suffer from degraded performance.

BRIEF SUMMARY OF THE INVENTION

A multiple function image capture apparatus that comprises a processor unit having firmware memory with instructions for implementing an operating system and random access memory for receiving at least one executable code section for performing a selected one of a plurality of image capture and serving tasks; a network access module for communicatively connecting the processor unit to an image capture appliance (ICA) code server, wherein the processor unit, in response to executing the operating system and selection of the task by a user, is adapted to request and receive from the server at least one executable code section for performing the selected task; and an image capture module for receiving and converting a visual image into a digital image signal and making said signal available to the processor unit for performing upon it the selected task pursuant to execution of the at least one received executable code section.

DETAILED DESCRIPTION

The present invention provides a system for implementing a streamlined, dynamically-programmable network appliance such as an image capture appliance (ICA). The ICA is capable of performing multiple image capture functions, e.g., optical character recognition (OCR), raster-to-vector conversion, photo restoration, photo-finishing, framing, etc. The ICA is also capable of serving the captured and manipulated images over a network connection. When a user selects a task such as OCR, the appliance dynamically downloads (e.g., from the Web) executable code necessary for performing the selected function. Therefore, the ICA does not require vast amounts of read only memory (ROM) that would otherwise be necessary for housing all of the firmware needed to perform the available tasks. In this way, multiple functions can be provided in a single appliance that preferably needs memory for carrying out one function at a time. This results in a less-expensive appliance that is still capable of performing numerous different, as well as complex, code-intensive, functions. In addition, because much (if not all) of its executable code is preferably downloaded from a central source on an as-needed basis, the code can be conveniently and continually updated for optimally maintaining the appliance. The dynamically downloaded code may also be in the form of an interpreted script, thereby allowing users to script their own routines. This may be facilitated by providing a section of executable code in binary form that acts as an interpreter along with a script file.

In addition to downloading the necessary code segments for implementing various ICA devices functions that are already known at the time that the ICA device shipped, an embodiment of the invention can have the ICA device periodically ask the ICA code server system if there are new functions available for this device. The user can be informed of any new functions through the user interface module. For example if there is a new ICA function that performs imaging transform XYZ that was not available at the time of purchase, the user may be charged for the new functionality, or it could be provided as a benefit.

Figure 1:
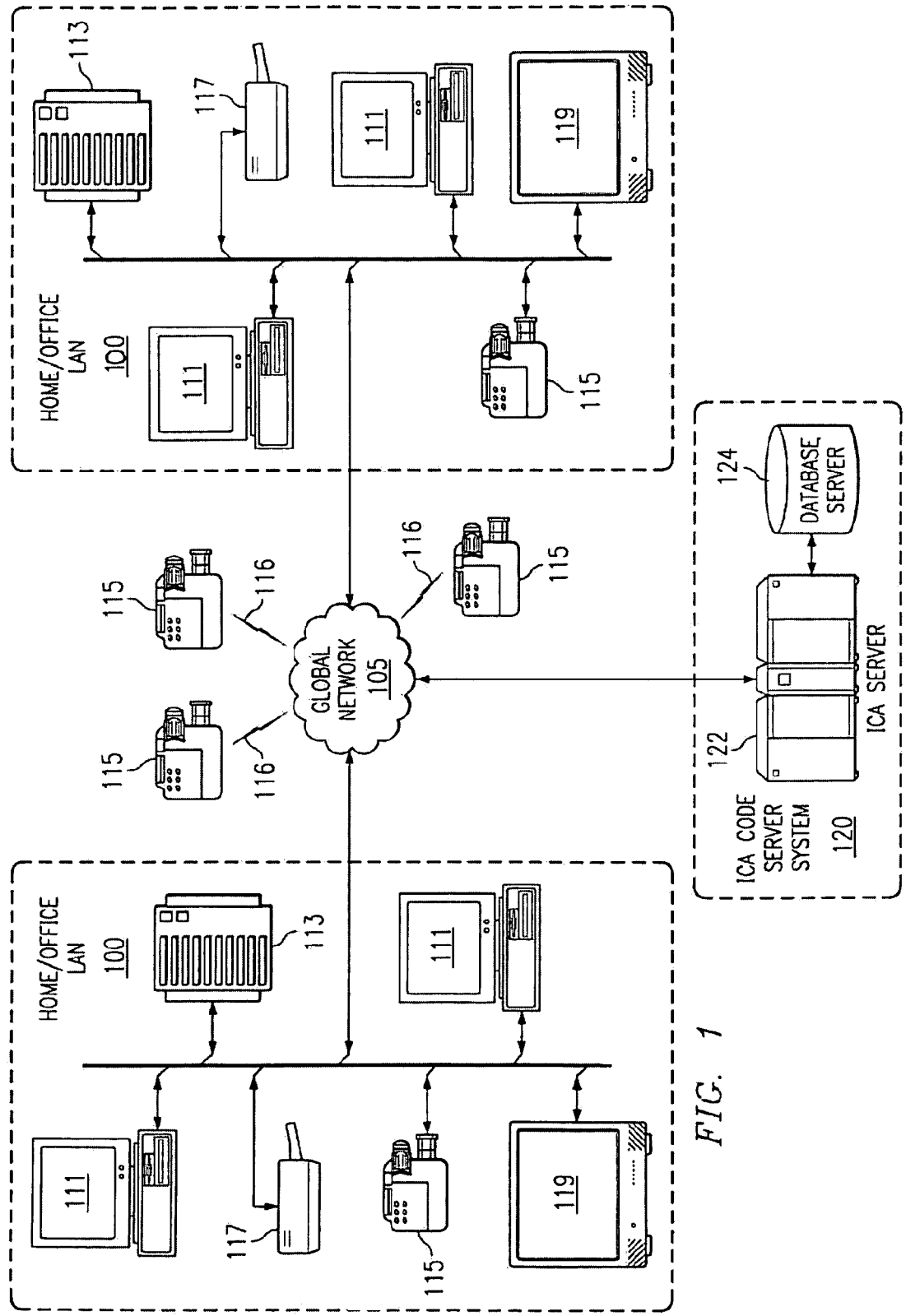
FIG. 1 is a block diagram of a system for implementing a network appliance, such as an image capture appliance (ICA), of the present invention.

FIG. 1 shows one embodiment of a network appliance system of the present invention. The system generally includes ICA code server system 120 communicatively linked to a plurality of ICAs 115 through network 105 such as the Internet. ICAs 115 may be connected to network 105 through either local network 100 (e.g., home LAN) or through direct communication link 116, e.g., via a wired or wireless modem connection. Exemplary local networks 100 comprise, for example, computers 111, file storage server 113, printer 117, and television 119, in addition to ICA 115. ICA code server system 120 preferably includes database server 124, which is operably connected to ICA server 122, which is connected to network 105. These servers will be addressed in greater detail below with regard to FIG. 2.

Network 105 may comprise any suitable network or network architecture such as the Internet, a dedicated wide area network (WAN) implemented e.g., via the public switched telephone network (PSTN), or any other suitable network, which preferably has broadband capability and can be wireline or wireless or a combination thereof. Similarly, communication links 116 can comprise any suitable devices for connecting ICAs 115 to network 105. For example, they could include but are not limited to, modem connections (wired or wireless), direct network connections such as through digital subscriber line (DSL), ISDN, TI, and hybrid connections such as with a combination satellite/telephone connection. Similarly, when connected to local network 100, ICAs 115 may be coupled to local network 100 via any suitable scheme. For example, it could be connected to local network 100 via a wireless connection, USB, FIREWIRE or the like. In turn, the local network 100 could be connected to network 105 via a T1, T3, ISDN, frame relay, ATM, DSL, cable modem, or any other suitable connection.

In operation, when an ICA is used for performing an image capture or serving task and does not currently possess the code needed to perform the selected task, the ICA submits a request to ICA server 122 for the executable code sections needed to perform the selected task. In response to this request, ICA server 122, based on the particular type of ICA 115 and the selected task requested, retrieves the necessary executable code for performing the task. The code is then transmitted back to ICA 115, where it is loaded into and executed by ICA 115 for performing the task. Depending on the task being performed, a captured and/or processed image file can then be automatically uploaded to a desired destination such as a file-server, a photo display web site (e.g., myfamily.com, Ofoto.com hpphoto.com), a project type web site (e.g., bluemountain.com), or an additional-processing type web site (e.g., netdocument.com, emniform.com). If the task is that of serving, the code downloaded will enable the ICA to act as a fileserver. For example, code portions offered may include code implementing the hyper text transfer protocol, file transfer protocol or other file transfer methods. Furthermore, With dynamically downloadable code segments, uploadable web addresses and sites can be monitored and updated.

Upon completion of the task, code may then be deleted. This would maintain sufficient space for receiving other code to handle other tasks. Alternatively, the downloaded code may be maintained in the ICA 115 until storage space is used up. At this time, a deletion manager can cause (or overwrite) certain code to free up space for new code. Code can be deleted based on a predetermined conditions, e.g., least-used or oldest-used.

Figure 2:
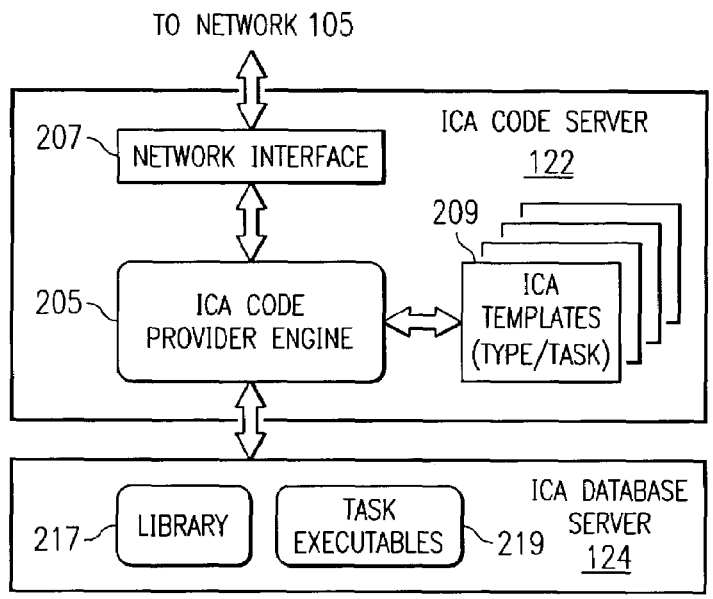
FIG. 2 is a block diagram of one embodiment of an ICA code server system of the present invention.

FIG. 2 shows one embodiment of ICA code server system 120 of FIG. 1. Code server system 120 generally comprises ICA code server 122, operably connected to ICA database server 124. ICA code server 122 is also connected to network 105, as previously discussed.

ICA code server 122 generally includes ICA code provider engine 205, network interface 207, and a plurality of ICA templates 209. Network interface 207 is communicatively linked to ICA code provider engine 205 for receiving code requests from ICAs and providing them to ICA code provider engine 205. Network interface 207 can be any suitable program for receiving code requests from ICAs 115. The specific type of network interface 207 will depend upon the type of network 105 that is being implemented. For example, if the Internet is used as network 105, then a suitable hyper text transfer protocol (HTTP) server application (e.g., APACHE, MICROSOFT IIS, NETSCAPE ENTERPRISE SERVER) could be used to implement the network interface 207. Similarly, any suitable programming scheme may be used for implementing ICA code provider engine 205. For example, it may be implemented with a common gateway interface (CGI) engine (e.g., with Perl scripts) that are invoked by a code request from an ICA.

Plurality of ICA templates 209 are made available to ICA code provider engine 205 during ICA code server operation. Each ICA template corresponds to a specific type of ICA and/or a specific task to be performed. The ICA templates include identifiers (or designators) for defining the necessary executable code sections (or modules) that are needed for performing a requested task from a specific type of requesting ICA 115. Thus, when a code request is received by ICA code provider engine 205, it retrieves from the plurality of ICA templates 209, a specific template that corresponds to the requesting ICA type and task to be performed. Code provider engine 205 then processes the retrieved template in order to retrieve and properly assemble (if necessary) the identified executable code sections (or segments) from ICA database server 124. The identified code segments are then transmitted back to the requesting ICA where they are executed for performing the specified task.

ICA database server 124 generally includes library folder 217, and task executables folder 219. Task executables folder 219 includes executable task code sections corresponding to the available tasks that the ICAs can perform. Likewise, library 217 includes binary (executable) library sections, which may be used by one or more of the various executable task sections. Database server 124 is a conventional database server for storing and providing to ICA code server 122 executable code sections (task, library). Database server 124 can be implemented with any suitable database scheme, including but not limited to flat-file, hierarchical, relational, and object-oriented databases.

Likewise, ICA code and database servers 122, 124 can be implemented with any suitable combination of one or more computers, including but not limited to mainframes, workstations, or personal computers, running operating systems such as Windows NT, UNIX, LINUX, or any other computer operating system.

When a task request is received within ICA code provider engine 205, code provider engine 205 retrieves appropriate ICA template 209. It then processes the template to identify the appropriate task executable section, along with any necessary executable library sections from library 217. Together, these task and library code sections constitute the necessary code segments that will be needed by ICA 115 for performing the specified task. ICA code processor engine 205 may simply retrieve these executable code sections and forward them to requesting ICA 115, or it may, in addition, dynamically link and/or compile the sections for proper loading and execution of the code within requesting ICA 115.

In an alternative embodiment, instead of having a template (or file) to identify the necessary code sections, each task section (for performing a selected task) includes one or more identifier tags for identifying the necessary library sections needed by the particular task section. Code provider engine 205 retrieves the appropriate task section(s) based on the selected task and particular type of requesting ICA. It then processes (reads) the retrieved task section(s) to identify any library sections that will be needed by the task section(s). With either of these schemes, entire libraries need not be downloaded to an ICA; rather, only the library portions that will be needed by the ICA to perform the task have to be downloaded. Note that a large function may be downloaded as a single segment or it may be separated into multiple segments. Each of the multiple segments may be separately downloaded. The multiple segments may be separately or sequentially executed to achieve the large function.

Figure 3:
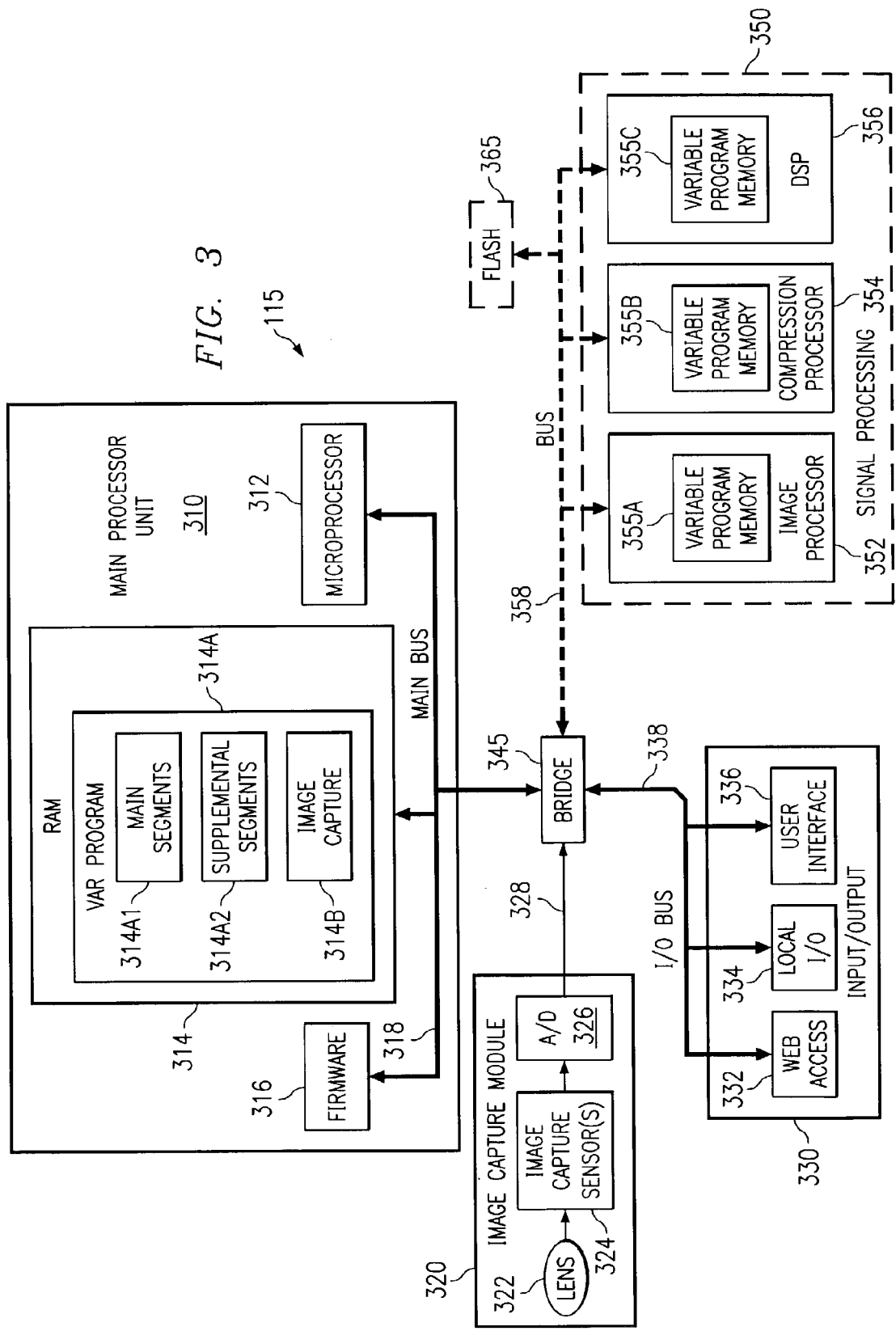
FIG. 3 is a block diagram of one embodiment of an ICA of the present invention.

FIG. 3 shows one embodiment of ICA 115 of the present invention. ICA 115 generally comprises main processor unit 310, image capture module 320, input-output section 330, and bridge (or bus interface circuit) 345. In an alternative embodiment, it also includes signal processing section 350 and/or flash memory 365. Main processor unit 310 is connected to bridge 345 via main bus 318. Likewise, image capture module 320 is connected to bridge 345 through bus 328, and input/output section 330 is connected to bridge 345 through an I/O bus 338. Bridge 345 serves to negotiate communications between busses 318, 328, and 338, and thus between main processor section 310, image capture section 320 and I/O section 330. It may be implemented with any suitable device or combination of devices such as a programmable logic device (such as, for example, a DSP) or decoder configuration. It could also be implemented with a single common bus with each section having appropriate decoding capability.

Main processor unit 310 comprises microprocessor 312, random access memory (RAM) 314, and firmware 316. Among other things, microprocessor 312 is responsible for controlling and monitoring other sections, 320 and 330. In addition, it preferably executes an embedded operating system and/or a task request application (stored in firmware 316) to perform task code retrievals from the ICA server in response to task requests from the users. It also preferably organizes and executes the received code segments in order to control the ICA to perform the requested task (e.g., photograph and image and upload the image file to a desired web site). RAM 314 includes sufficient memory for providing VAR (variable) program section 314A and image capture section 314B. VAR program section 314A further includes main segments section 314A1 and supplemental segments section 314A2 for receiving and enabling the microprocessor to execute retrieved code segments from ICA code server 122. Image capture section 314B provides a sufficient work space for receiving a captured image file from image capture section 320 and enabling the microprocessor to work with it.

Image capture module 320 preferably includes necessary hardware for capturing and digitizing an image (e.g., from a document or a three-dimensional object). Image capture module 320 includes lens 322, image capture sensor 324, and A-to-D converter 326. Lens apparatus 322 comprises the physical optical apparatus for optically receiving the image that is to be captured. Image capture sensors 324 comprise the necessary components for converting the image from an optical into an electrical form. For example, image capture sensor 324 could comprise a charge couple device (CCD), such as a linear scan device, or an area scan device, such as a 2.8 megapixel (1280×1600) CCD area, or CMOS VGA (640×480, or SVGA 1024×768) device. The image capture sensors receive the optical image from lens 322, and convert it into an analog image signal, which is provided to A-to-D converter 326. A-to-D converter 326 then converts the analog image signal into a digital image signal, which is provided to bridge 345 through 328. A-to-D converter 326 may comprise any suitable circuitry for performing an analog-to-digital conversion on the received analog image signal.

Input-output section 330 is communicably connected to main processor unit 310 through bridge 345 and I/O bus 338. Input-output section 330 comprises the devices for implementing the various input and output functions for ICA 115. In the depicted embodiment, input-output section 330 generally includes network access module 332, local I/O module 334, and user interface section 336. Each of these modules (or sections) are connected to I/O bus 338, and are thereby separably accessible to main processor unit 310 via bridge 345. Network access module 332 is responsible for linking ICA 115 to network 105. It may include devices such as a modem, a wireless interface module, or any other components necessary for communicatively connecting the ICA to network 105. Local I/O section 334 comprises the available input and output ports utilized for connecting ICA 115 to external devices. For example, I/O section 334 may include parallel, serial, 802.11 ports, universal serial bus (USB) ports, IEEE 394 FIREWIRE ports, and/or BLUETOOTH wireless modem devices (e.g., for connecting the ICA to local network 100). User interface section 336 corresponds to the various control and monitoring devices used by a user for controlling and accessing ICA 115. These devices could include a keyboard, a keypad, switches, and a cursor control device (e.g., mouse, touch-pad, joystick). It could also include a panel such as a liquid crystal display for displaying selected functions, modes, images, and commands. In one embodiment, user interface module 336 also comprises dedicated buttons, which may either be pre-programmed by a manufacturer or programmable by a user) for performing specific tasks such as scanning a document and uploading it to a specified destination.

In operation, a user preferably selects a specified task through user interface 336. This causes main processor unit 310 to configure the different sections within ICA 115 for performing the specified task, and transmit a task code request to ICA code server 122, if necessary, through, e.g., web access module 322 or local I/O module 324, depending upon the particular network 105 being implemented, as well as on how ICA device 115 is connected to network 105. In turn, ICA code server 122 transmits the requested code sections for performing the requested tasks back to ICA device 115. These code sections are transmitted through either web access module 322 or local I/O section 334. From here, they are conveyed through bridge 345 to main processor unit 310. Main processor unit 310 then distributes the code sections to the appropriate memory locations (e.g., within RAM 314), depending upon the task being requested. In addition, main processor unit 310 may link and/or compile any of the code sections as required by the specific function being performed. From here, the processor executes the received code, thereby causing ICA 115 to perform the requested task.

Alternatively, code may be downloaded which performs the functions of an interpreter. Requests for scripts may be negotiated in the same manner of retrieving other executable code. The interpreter may then proceed to process the script and execute the appropriate tasks defined by the script. In an alternative implementation, once the interpreter has been loaded, scripts may be requested to perform the desired tasks. The scripts may be provided by the manufacturer or developed by an end-user, thus offering a great degree of flexibility.

In another embodiment, instead of performing all image processing tasks in the main processor unit, the depicted ICA can also include signal processing section 350 for performing at least some of these tasks outside of the processor unit. This not only can speed up the ICA, but also, it can increase its overall functionality.

The depicted optional signal processing section 350 is connected to main processor unit 310 through bridge 345 and bus 358. It includes image processor 352, compression processor 354, and general digital signal processor (DSP) 356. Each of these processors further include variable program memory section (e.g., RAM section) 355A, 355B, and 355C, respectively, for receiving downloaded executable code sections from main processor unit 310, depending upon the particular task that is to be performed. Image processor 352 may be implemented with any suitable combination of devices for performing image processing tasks, such as real time de-mosaic, color correction, white balancing, gamma correction, and image previewing. Similarly, compression processor 354 may be implemented with any suitable combination of devices for performing tasks such as compression (e.g., MPEG), encryption/decryption, and other streaming functions. For example, it could be implemented with conventional MPEG compression chips. DSP processor 356 is a specialized processor device(s) for performing any necessary signal processing tasks not addressed by main processor unit 310, image processor 352 or compression processor 354. It may be implemented with any suitable digital signal processing components. It should be recognized that any combination of these components may be incorporated into an ICA of the present invention. Depending upon specific design considerations, the various image and/or signal processing tasks may be performed by main processor unit 300 or by any suitable combination of the main processor unit in cooperation with components in the signal processing section.

Figure 4:
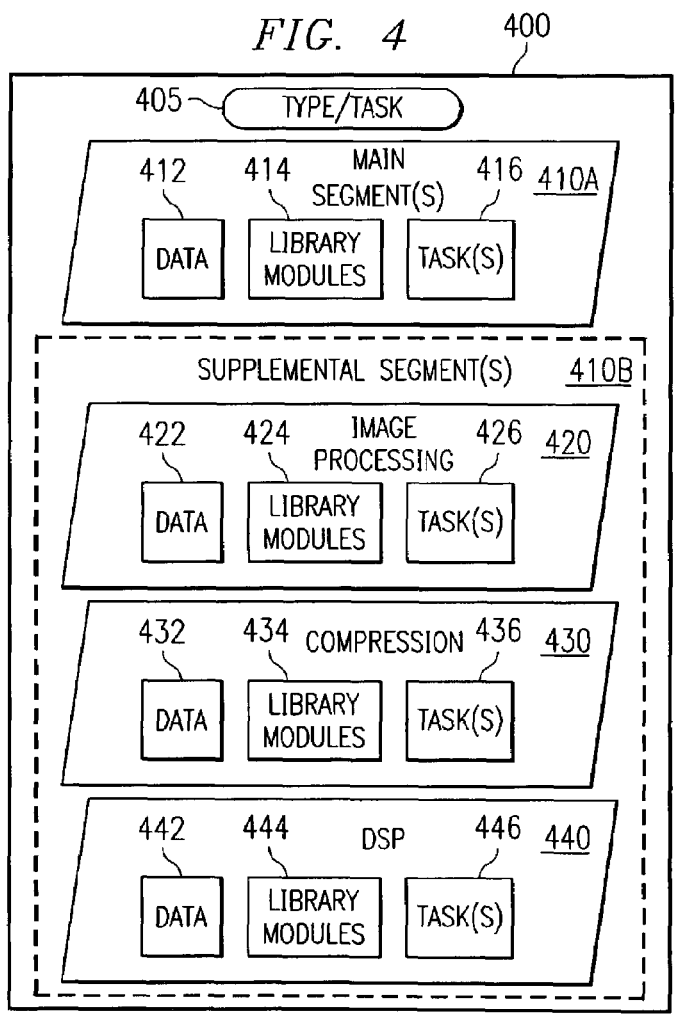
FIG. 4 shows one embodiment of an exemplary template to be processed by one embodiment of an ICA code provider engine of the present invention.

FIG. 4 shows one embodiment of an exemplary template for performing an image capture task with image capture device 115 of FIG. 3. Template 400 generally comprises type/task identifier field 405 (for identifying a particular template based on the requesting ICA and the requested task), and one or more segment identifiers in main segment section 410A and supplemental section 410B. Depicted main segment 410A includes a single main segment identifier, while the supplemental section includes supplemental segment identifiers 420, 430, and 440. The main segment identifiers identify code segments to be loaded in main segments section 314A1, and the supplemental segment identifiers identify segments to be loaded in supplemental RAM section 314A2. The main segment(s) are responsible for the basic (or primary) task (e.g., image scan), while the supplemental segments allow the ICA to perform additional functions such as the image processing functions. For each template, the needed code segments will depend upon the type of ICA 115 as well as upon the particular task being requested. In the depicted embodiment, each section identifier includes a data field, a library modules field, and a tasks field, for defining the specific executable code segments and sub-segments, along with any initial-condition parameters, for the specific task or function being implemented by the segment identifier. In the depicted template, the main processor segment identifier comprises data field 412, library modules field 414, and tasks field 416. Image processing segment identifier 420 comprises data section 422, library module section 424, and tasks section 426. Likewise, the compressor processing segment identifier comprises data field 432, library modules field 434, and tasks field 436. Finally, DSP processing segment identifier 440 includes data field 442, library modules field 444, and tasks module 446.

Figure 5:
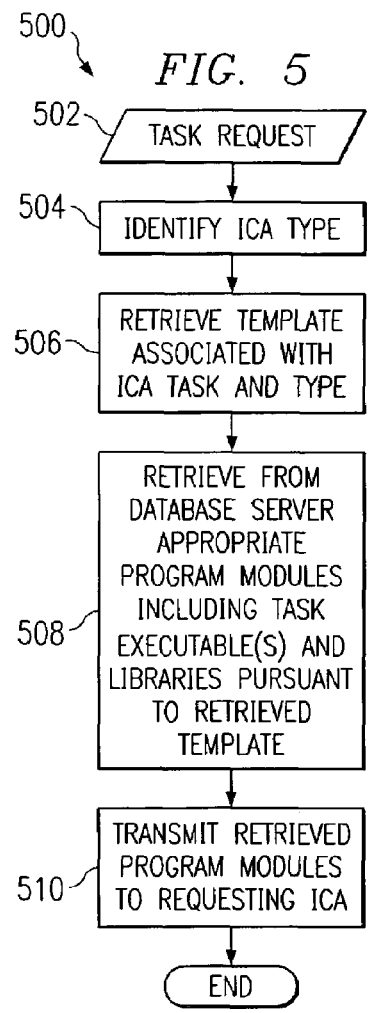
FIG. 5 is a flow diagram of one embodiment of a routine to be implemented in one embodiment of an ICA code server engine of the present invention.

FIG. 5 shows one embodiment of a routine 500 implemented by ICA code provider engine 205. This exemplary routine will be discussed in connection with ICA 115 of FIG. 3 and ICA task/type template 400 of FIG. 4. Initially, at block 502, the code provider engine receives and identifies task request from ICA 115. At block 504, it identifies the type of ICA device 115, along with the specific tasks being requested. Next, at block 506, it retrieves the particular task/type template that is associated with the ICA task and type request. Next, at block 508, it retrieves the appropriate executable code sections from database server 124, including task sections and library sections pursuant to the previously retrieved template. Finally, at block 510, the code provider engine transmits the retrieved code sections back to requesting ICA 115, which are then loaded within the appropriate memory sections of ICA 115. The executable code sections (e.g., from the task folder and library) may also be linked and/or compiled by the code provider engine, if necessary.

What is claimed is:

1. A multiple function image capture apparatus, comprising:
   a processor unit having firmware memory with instructions for implementing an operating system and random access memory for receiving at least one executable code section for performing a selected one of a plurality of image capture tasks;
   a network access module for communicatively connecting the processor unit to an image capture appliance (ICA) code server, wherein the processor unit, in response to executing the operating system and selection of the task by a user, is adapted to request and receive from the server at least one executable code section for performing the selected task; and
   an image capture module for receiving and converting a visual image into a digital image signal and making said signal available to the processor unit for performing upon it the selected task pursuant to execution of the at least one received executable code section.

2. The apparatus of claim 1 wherein the at least one executable code section comprises an interpreter able to interpret scripts defining tasks.

3. The apparatus of claim 1 wherein the at least one executable code section comprises a file server operable to send files via the network access module.

4. The apparatus of claim 3 wherein the file server implements the hyper text transfer protocol.

5. The apparatus of claim 3 wherein the file server implements file transfer protocol.

6. The apparatus of claim 1 wherein the network access module comprises a modem for linking the processor unit to a cooperating modem connected to a network that is connected to the ICA code server.

7. The apparatus of claim 1 wherein the image capture tasks comprise image processing functions on the digital image signal.

8. The apparatus of claim 7 further comprising a signal processor unit operably connected to the processor unit for assisting said processor unit in performing the selected image capture task.

9. The apparatus of claim 8 wherein the signal processor unit comprises random access memory for receiving and executing at least one of the at least one executable code section.

10. The apparatus of claim 1 wherein the operating system comprises a function for operably linking together any necessary portions of the received at least one executable code section.

11. The apparatus of claim 1 wherein the operating system comprises a function for transmitting a digital image file to a designated location on a network that is communicatively linked to the processor unit via the network access module.

12. The apparatus of claim 11 wherein the designated location comprises a web page on the Internet.

13. An image capture appliance (ICA) code server system, comprising:
 an ICA code server for providing to a requesting ICA at least one executable code section for performing a selected task; and
 a database having a plurality of executable code sections from which the provided at least one code section is retrieved;
 wherein said ICA code server comprises an ICA code provider engine for retrieving the at least one executable code section from said plurality of code sections based on the ICA type and on the selected task.

14. The system of claim 13 wherein said database is external to said ICA server and operably connected to said ICA code server.

15. The system of claim 13 wherein the ICA code server comprises a network interface for operably connecting the ICA code server to a network that is accessible to the ICA.

16. The system of claim 15 wherein the network interface comprises a hyper text transfer protocol server application for operably connecting the ICA code server to the Internet.

17. The system of claim 16 wherein the ICA code provider engine is implemented as a common gateway interface application on the Internet-accessible ICA code server.

18. The system of claim 13 wherein the ICA code provider engine processes a template file associated with the requesting ICA and the selected task to provide the appropriate at least one executable code section to the requesting ICA.

19. The system of claim 18 wherein the template designates executable task and library code sections needed by the ICA for performing the selected task.

20. The system of claim 19 wherein the ICA code provider engine links together the designated task and library code sections for execution by the requesting ICA.

21. The system of claim 13 wherein the at least one code section comprises a task and library code section, the task section having tags for designating the library section to be retrieved.

\* \* \* \* \*